United States Patent [19]

Duke

[11] Patent Number: 4,844,390
[45] Date of Patent: Jul. 4, 1989

[54] HUNTER'S PORTABLE ARM REST

[76] Inventor: Henry Duke, 408 Front St., Brownsville, Pa. 15417

[21] Appl. No.: 73,568

[22] Filed: Jul. 15, 1987

[51] Int. Cl.$^4$ ............................................. F41C 29/00
[52] U.S. Cl. ................................... 248/118; 248/286; 42/94
[58] Field of Search ................. 248/118, 118.1, 118.3, 248/118.5, 284, 285, 286; 42/94

[56] References Cited

U.S. PATENT DOCUMENTS

| | | | |
|---|---|---|---|
| 46,365 | 2/1865 | Kinman | 248/118.3 |
| 167,169 | 8/1875 | Hare . | |
| 281,338 | 7/1883 | Butler | 248/118.3 |
| 409,239 | 8/1889 | Roller | 248/304 |
| 437,036 | 9/1890 | McGann | 248/286 |
| 454,300 | 6/1891 | Sproul . | |
| 759,593 | 3/1909 | Cover . | |
| 915,481 | 10/1943 | Roop . | |
| 988,923 | 4/1911 | Bauerfeind | 248/118 |
| 1,025,476 | 5/1912 | Mellen | 248/118 |
| 1,364,118 | 1/1921 | Lamkin | 248/286 |
| 1,890,423 | 2/1932 | Teagarden . | |
| 2,172,178 | 9/1939 | Rosenberg | 248/118 |
| 2,251,592 | 8/1941 | Lowe | 248/286 |
| 2,403,654 | 7/1946 | Gerdes | 248/118 |
| 2,498,736 | 2/1950 | Freund | 248/285 |
| 2,681,200 | 6/1954 | Bisson | 248/285 |
| 3,304,036 | 2/1967 | Davis | 248/286 |
| 3,390,477 | 7/1968 | Galbraith | 248/118 |

FOREIGN PATENT DOCUMENTS 16919 of 1914 United Kingdom ................ 248/118

Primary Examiner—Alvin C. Chin-Shue
Assistant Examiner—Robert A. Olson
Attorney, Agent, or Firm—Buchanan Ingersoll; Michael L. Dever

[57] ABSTRACT

An arm rest for supporting an extended upper arm is provided in which the arm rest can be adjusted to accommodate the height of the user. Particularly adapted for hunting, the arm rest attaches to the belt of a hunter and extends upward to an arm pad upon which the hunter rests his upper arm while aiming at his target. The length of the arm rest as well as its angular position relative to the hunter can be easily adjusted to provide the most comfortable setting for the hunter. When not in use, the arm rest can be recessed and hang from the waist so as to not interfere with walking about. Alternatively, the arm rest can pivot about its base and be secured in a rearward direction, preventing its entanglement in brush.

8 Claims, 3 Drawing Sheets

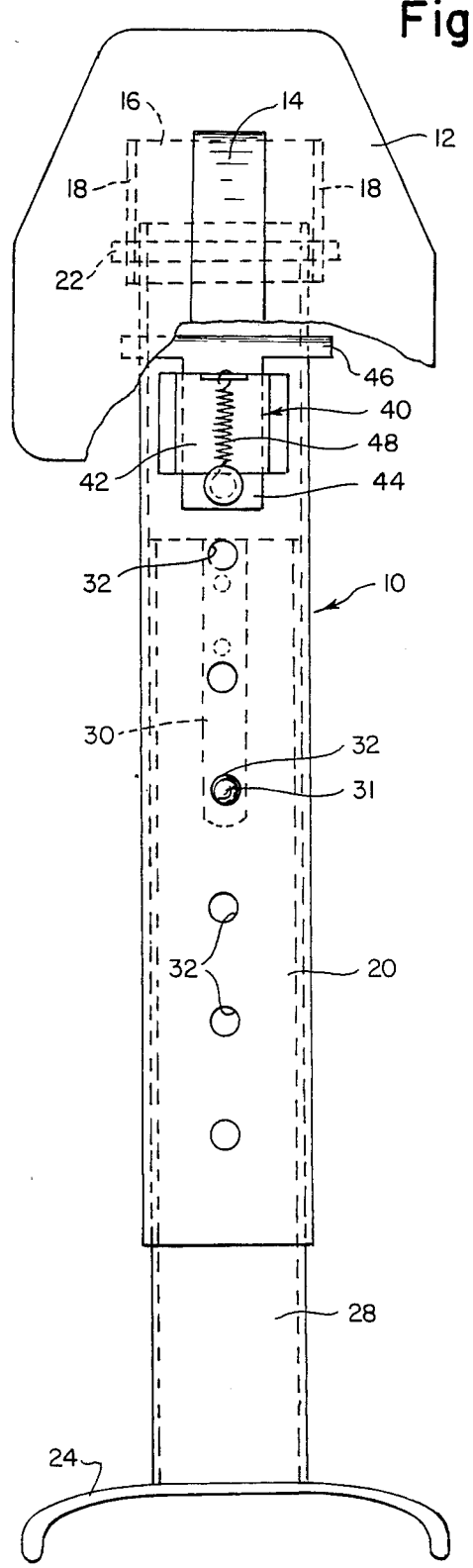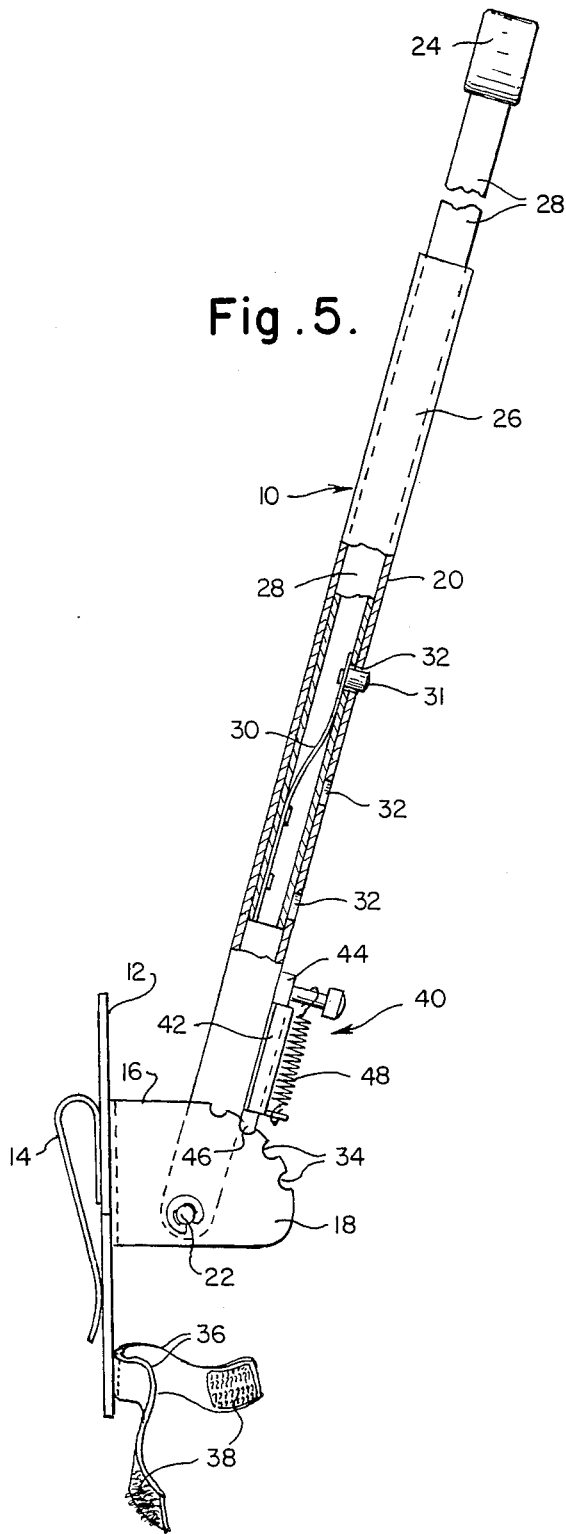

HUNTER'S PORTABLE ARM REST

BACKGROUND OF THE INVENTION

1. Field of the Invention

The present invention relates to an arm rest for supporting the upper arm while aiming a gun so as to eliminate fatigue.

2. Description of the Prior Art

A hunter encounters numerous problems in the pursuit of his game. One of these problems is the necessity of keeping a steady aim on the target until a clear shot is available. Oftentimes, the hunter must keep his aim on the target for a prolonged period of time. This causes fatigue and tiring of the upper arm.

To solve this problem of fatigue, there have been many attempts in the past to provide support to the upper arm while aiming a gun. Typical attempts include the provision of a support arm which extends from a base member attached to the waist up to a U-shaped arm receiving member. Generally, the length of the support arm can be adjusted. However, because no provision is made for locking the support arm in more than one angular relationship with the base member, the utility of these arm rests is limited by the height of the hunter.

A further problem encountered in the use of the prior arm rests is that, although the arm rests can be recessed to assist in walking, the arm rests are forced to hang downward from the waist. Because there is no give in the inclination of the arm rest, the arm rest frequently becomes entangled in brush which the hunter passes. This causes added difficulty in moving as well as creating extra noise which may chase off the desired game. Accordingly, there is a need for an arm rest which is capable of locking in a number of angular positions and one which can be recessed and carried from the waist in a position which will not cause it to be entangled in brush.

SUMMARY OF THE INVENTION

In accordance with the present invention there is provided an improved arm rest for supporting the upper arm while aiming a gun. A base member is provided which is capable of being attached to the belt of a hunter worn around his waist. A bracket is attached to the base member and a support bar telescopically extends therefrom. The support arm terminates in an arm receiving member. A plate having a pin which is positioned transverse to the extension of the support bar is slidably arranged with the support bar. The pin fits into detents which are located on the periphery of the bracket. A spring, or other resilient means, pulls the pin into the detent, locking the support bar in a determined angular relationship with respect to the base member. When not in use, the support bar can be recessed and hang downward from the base member.

Alternatively, the base member can be rotatably attached to a belt pad which attaches to the hunter's belt. In this alternative arrangement, the base member can swivel with respect to the belt pad. Bullet latch locking means are used to lock the base member in one of a number of arrangements with the belt pad. The support bar can then be locked in a horizontal position, pointing rearward from the hunter, as well as in a vertical position. This prevents the support bar from becoming entangled in brush. Other objects and advantages of the invention will become apparent as a description of the preferred embodiments proceeds.

BRIEF DESCRIPTION OF THE DRAWINGS

FIG. 4 is a rear elevational view partially broken away of the arm rest of FIG. 1.

FIG. 5 is a side elevational view of the arm rest of my invention in position for operation.

DESCRIPTION OF THE PREFERRED EMBODIMENTS

Figure 1:
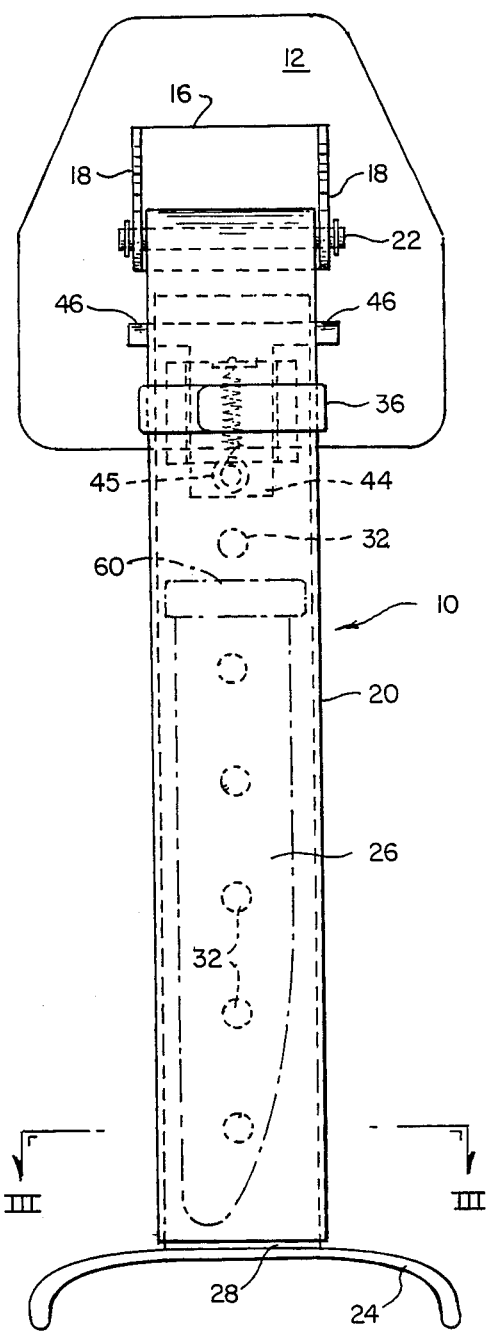
FIG. 1 is a front elevational view of the arm rest of my invention when not in use.
Figure 2:
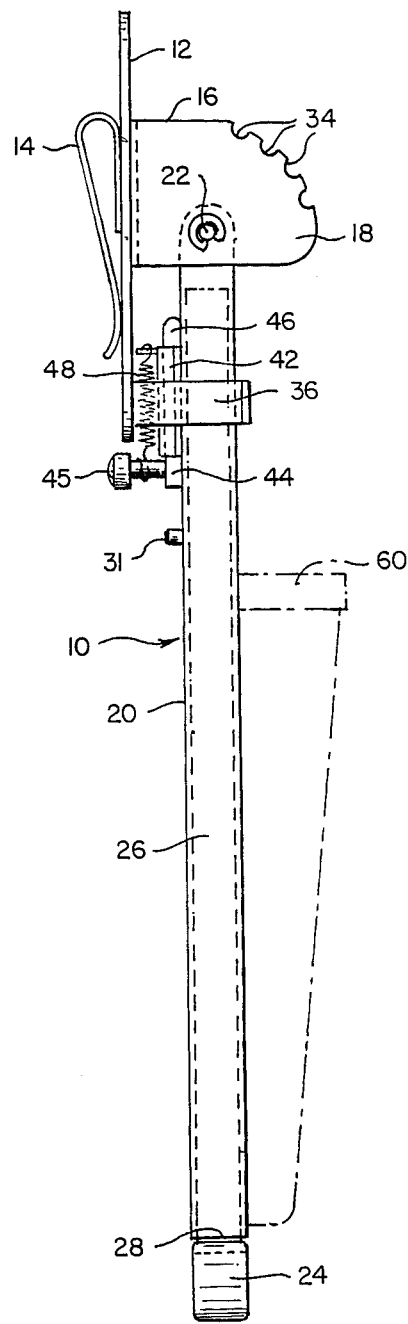
FIG. 2 is a side elevational view of the arm rest of FIG. 1.
Figure 3:
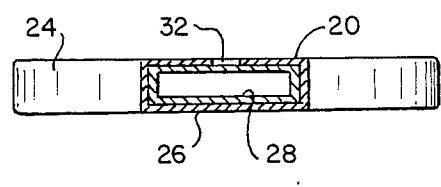
FIG. 3 is a sectional view of the arm rest of FIG. 1 taken on the line III—III.

As shown in FIG. 1 through 5, my arm rest 10 is designed to be attached to the belt or waist band of a hunter by means of a belt clip 14 attached to the back of base member 12. Bracket 16, which is generally U-shaped, is attached to base member 12 and has extending arms 18. A telescoping support bar 20 is pivotally connected to bracket 16 by pin 22. support bar 20 extends away from base member 12 and terminates with arm pad 24. Arm pad 24 supports a hunter's upper arm while the hunter aims a gun.

Support bar 20 is formed by an outer member 26 into which inner member 28 is slidably inserted. Support bar 20 can be adjusted to various lengths by moving inner member 28 within outer member 26. Arm pad 24 is attached to the extending end of inner member 28. Catch spring 30 and projecting spring 31 acting with catch holes 32 fasten the support bar 20 at a desired length. To adjust the length of support bar 20, projecting spring 31 is depressed within catch hole 32, thereby permitting inner member 28 to be re-positioned within outer member 26. In this manner, the length of my arm rest 10 can be adjusted to suit the height of the hunter using it.

In addition to its length adjustment, my arm rest 10 can also be adjusted in a number of angular positions. In use, support bar 20 is rotated upward, pivoting around pin 22 in bracket 16. Detents 34 located on the upper periphery of the extending arms 18 of bracket 16 are adapted to receive locking pin 46 of locking means 40 which is slidably arranged with support bar 20.

Locking means 40 includes a U-shaped base 42 which is connected to support bar 20. T-shaped member 44 is adapted to slide between U-shaped base 42 and support bar 20. Locking pin 46, which comprises the top of T-shaped member 44, is oriented transverse to the extension of support bar 20 and is adapted to be received by detents 34. Spring 48 prevents T-shaped member 44 from sliding out from between U-shaped base 42 and support bar 20.

The detents 34 on each arm 18 of bracket 16 coact with each other and with locking pin 46 so as to fix support bar 20 in a desired angular relationship with base member 12. Spring 48 provides the necessary tension to keep locking pin 46 positioned within detents 34, effectively securing the support bar 20 in a desired angular relationship with base member 12. To re-adjust this angular relationship, projection 45 is used to slide T-shaped member 44 away from bracket 16, thereby causing locking pin 46 to disengage detents 34. Support bar 20 is then positioned at the desired angle and projection 45 is released to re-engage locking pin 46 within detents 34. Thus, both the length and the angular position of my arm rest 10 can be adjusted to a number of desired positions.

When not in use, my arm rest 10 is designed to be easily carried. Inner member 28 of support bar 20 is recessed within outer member 26. Support bar 20 can then be rotated downward about pin 22 and bracket 16 so as to rest against base member 12. If desired, strap 36, which is connected in its middle to base member 12 and has two free ends, can wrap around support bar 20 to secure it from swinging. Fastener 38 locks the two free ends of strap 36 and maintains support bar 20 in a generally immobile arrangement extending vertically downward. Typical fasteners 38 include Velcro brand fasteners, as shown in FIG. 5 as well as snaps and buttons. By maintaining arm rest 10 in a downward vertical position, the hunter can easily walk about and the arm rest 10 stays comfortably out of the way.

My arm rest 10 may be provided with knife sheath 60 which is capable of accepting a standard sized hunting knife. Knife sheath 60 is preferably attached to that portion of support bar 20 which is away from the hunter's body when the arm rest 10 is not in use. Sheath 60 is positioned on support bar 20 so that a knife would remain in the sheath when support bar 20 is raised and my arm rest 10 is put to use.

Figure 6:
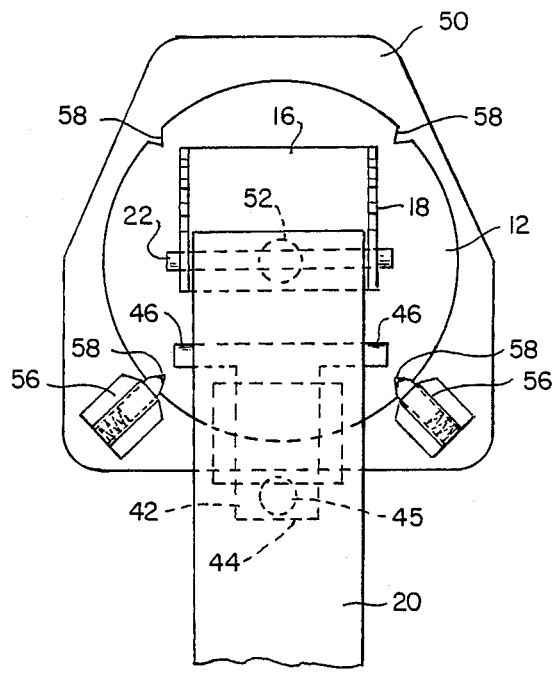
FIG. 6 is a partial front elevational view of an alternate embodiment of the arm rest of my invention.
Figure 7:
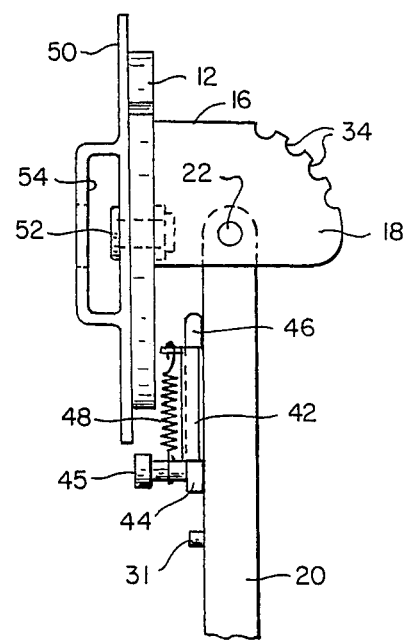
FIG. 7 is a side elevational view of the arm rest of FIG. 6.
Figure 8:
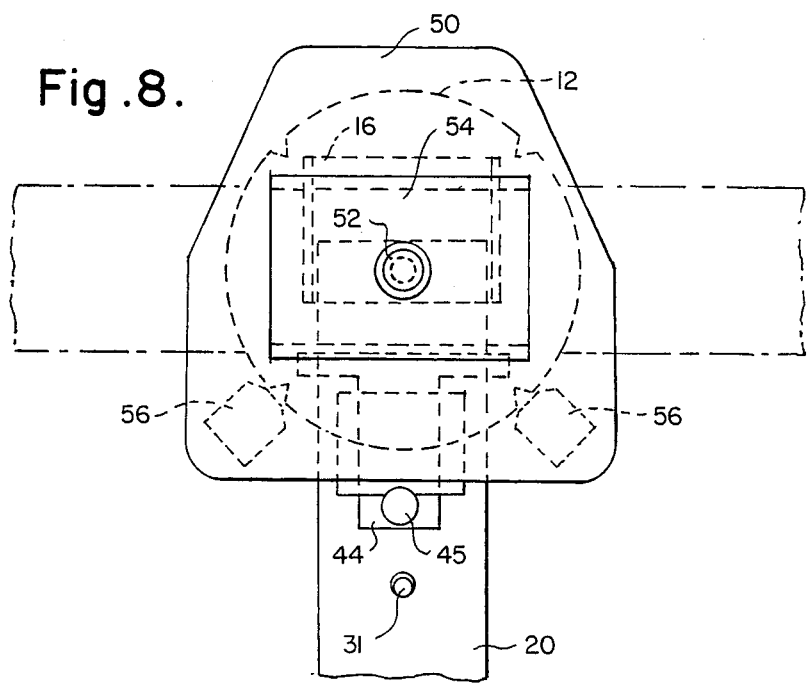
FIG. 8 is a rear elevational view of the arm rest of FIG. 6.

Although strap 36 and fastener 38 can lock my arm rest 10 in a comfortable position for walking, it is possible that the extended support bar 20 can be caught on bushes or large plants. To prevent this occurrence, I add a belt pad 50 and pivot pin 52 to the arm rest assembly, as shown in FIGS. 6 through 8. Base member 12 is modified to be of a generally circular shape. The belt clip is removed from the back of base member 12 and pivot pin 52 is attached thereto. Pivot pin 52 is attached at its other end to belt pad 50. A belt clip can be reattached on the back side of belt pad 50. Alternatively, belt loop 54, through which the hunter's belt is inserted, can be built into the belt pad 50.

Preferably, two bullet latches 56 are attached to belt pad 50. Bullet latches 56 are positioned so as to be received by receiving notches 58 located on the periphery of base member 12. Base member 12 can pivot about pivot pin 52 and assume one of a variety of positions with respect to belt pad 50. Bullet latches 56 will coact with receiving notches 58 to secure base member 12 in a firing position, or secure the arm rest 10 such that support bar 20 extends in either a forward or backward pointing arrangement. When support bar 20 extends horizontally in a backward direction with respect to the hunter, the arm rest 10 is prevented from being caught or snagged in brush.

Although I have discussed my invention as it applies to the support of the upper arm of a hunter, it is to be understood that my invention can be used in any number of activities in which the upper arm is extended over a lengthy period of time. The support provided to the upper arm by my arm rest prevents the fatigue commonly associated with many such activities.

While I have shown and described a present preferred embodiment of the invention, it is to be distinctly understood that the invention is not limited thereto but may be otherwise variously embodied and practiced within the scope of the following claims.

I claim:

1. An arm rest comprising:
   (a) a base member;
   (b) a bracket attached to said base member;
   (c) a telescopically extending, elongated support bar having a first end pivotally attached to said bracket, said support bar extending outward from said bracket;
   (d) first locking means provided on said support bar for locking said support bar at any one of a plurality of positions each of which may be selected by a user of the arm rest;
   (e) an arm pad attached to a second end of the support bar and adapted to support an extended arm of the user;
   (f) second locking means sized and positioned for locking said support bar at one of a plurality of angular relationships with said base member each of which may be selected by the user of the arm rest; and
   (g) a belt pad having a belt receiving portion which is adapted to receive a belt wrapped around the waist of the user of said arm rest, said belt pad being rotatably attached to said base member so that said base member is capable of rotating about said belt pad when said support bar encounters a low-lying obstruction.

2. The arm rest of claim 1 further comprising locking means provided on at least one of said belt pad and said base member to lock said base member in a position in which said support extends substantially parallel to a belt attached to the belt pad.

3. The arm rest of claim 2 wherein said locking means comprises a plurality of bullet latches attached to said belt pad and receiving notches located on the base member, said bullet latches adapted to be secured within said receiving notches, thereby locking the base member in a desired relationship with said belt pad.

4. The arm rest of claim 1 wherein said second locking means comprises detents positioned along the periphery of said bracket; a pin arranged on said support bar in a position transverse to the support bar, said pin being sized and positioned to fit within said detents on said bracket; and resilient means which maintains said pin within said detents.

5. The arm rest of claim 4 wherein said resilient means is a coil spring.

6. The arm rest of claim 1 wherein a knife sheath is attached to a side of said support bar.

7. The arm rest of claim 1 further comprising third locking means which retains said support bar in a generally immobile arrangement when said arm rest is not in use.

8. The arm rest of claim 7 wherein said third locking means is a fastening strap attached to said base member and adapted to wrap around said support bar for locking said support bar in a generally immobile arrangement.

* * * * *

UNITED STATES PATENT AND TRADEMARK OFFICE
CERTIFICATE OF CORRECTION

PATENT NO. : 4,844,390
DATED : July 4, 1989
INVENTOR(S) : HENRY DUKE

It is certified that error appears in the above-identified patent and that said Letters Patent is hereby corrected as shown below:

Column 2, line 9, after "a" insert --side--.

Signed and Sealed this

Twenty-fourth Day of July, 1990

*Attest:*

HARRY F. MANBECK, JR.

*Attesting Officer*     *Commissioner of Patents and Trademarks*